US008834723B1

(12) United States Patent
Richerand et al.

(10) Patent No.: US 8,834,723 B1
(45) Date of Patent: Sep. 16, 2014

(54) SMART WATER DISCHARGE MONITORING SYSTEM

(75) Inventors: Frank A. Richerand, Covington, LA (US); Frank A. Richerand, II, Covington, LA (US)

(73) Assignee: Enviro-Tech Systems, L.L.C., Folsom, LA (US)

( * ) Notice: Subject to any disclaimer, the term of this patent is extended or adjusted under 35 U.S.C. 154(b) by 614 days.

(21) Appl. No.: 13/208,859

(22) Filed: Aug. 12, 2011

Related U.S. Application Data

(60) Provisional application No. 61/466,267, filed on Mar. 22, 2011.

(51) Int. Cl.
 *C02F 1/40* (2006.01)
 *B01D 29/60* (2006.01)
 *B01D 36/00* (2006.01)
 *C02F 101/32* (2006.01)
 *C02F 1/24* (2006.01)
 *C02F 103/10* (2006.01)

(52) U.S. Cl.
 CPC .............. *C02F 1/40* (2013.01); *B01D 36/003* (2013.01); *C02F 2101/32* (2013.01); *C02F 2209/003* (2013.01); *C02F 2209/005* (2013.01); *C02F 1/24* (2013.01); *B01D 29/606* (2013.01); *C02F 2103/10* (2013.01)
 USPC ........... 210/702; 210/739; 210/741; 210/806; 210/96.1; 210/134; 210/195.1; 210/259; 210/299; 210/341

(58) Field of Classification Search
 CPC .......... C02F 1/24; C02F 1/40; C02F 2101/32; C02F 2103/008; C02F 2103/01; C02F 2201/001; C02F 2209/003; C02F 2209/005; C02F 2209/03; B01D 29/52; B01D 29/60; B01D 29/606; B01D 36/003
 USPC ........ 210/702, 739, 741, 804, 805, 806, 96.1, 210/109, 134, 143, 195.1, 259, 299, 340, 210/341
 See application file for complete search history.

(56) References Cited

U.S. PATENT DOCUMENTS

| | | | | |
|---|---|---|---|---|
| 3,966,603 A * | 6/1976 | Grant | ............................ | 210/739 |
| 4,315,822 A * | 2/1982 | Jaisinghani | .................. | 210/96.1 |
| 4,649,281 A * | 3/1987 | Schmitt et al. | ............... | 210/96.1 |
| 4,830,755 A * | 5/1989 | Hardin | .......................... | 210/806 |
| 5,156,745 A | 10/1992 | Cairo, Jr. et al. | | |
| 5,350,527 A * | 9/1994 | Kitko | ............................ | 210/804 |
| 5,366,641 A * | 11/1994 | Hadfield et al. | .............. | 210/739 |
| 5,492,632 A * | 2/1996 | Reber | ........................... | 210/739 |
| 5,545,330 A * | 8/1996 | Ehrlich | ......................... | 210/703 |
| 5,730,878 A * | 3/1998 | Rice | ............................. | 210/96.1 |
| 6,077,433 A | 6/2000 | Brun Henriksen et al. | | |
| 6,491,824 B1 | 12/2002 | Lin et al. | | |
| 6,838,006 B2 * | 1/2005 | Feierabend et al. | .......... | 210/739 |
| 6,951,614 B2 * | 10/2005 | Brett et al. | ..................... | 210/741 |
| 2003/0141228 A1 * | 7/2003 | Vazquez Perez et al. | .... | 210/96.1 |

(Continued)

*Primary Examiner* — Christopher Upton
(74) *Attorney, Agent, or Firm* — Garvey, Smith, Nehrbass & North, L.L.C.; Gregory C. Smith; Julia M. FitzPatrick

(57) ABSTRACT

The system and process of the present invention will consist of specific monitors in tandem with interface probes reading in multiple locations, divert valves which are operated by the readings of the interface probes and online ppm monitors. Such monitors would function in conjunction with these leading indicators through a software program and computerized logic controller used to manipulate the controls of this system.

11 Claims, 1 Drawing Sheet

(56) References Cited

U.S. PATENT DOCUMENTS

| | | |
|---|---|---|
| 2003/0168391 A1 | 9/2003 | Tveiten |
| 2005/0217999 A1 | 10/2005 | You et al. |
| 2006/0217526 A1 | 9/2006 | Pivovar et al. |
| 2008/0017558 A1 | 1/2008 | Pollock et al. |
| 2008/0217212 A1 | 9/2008 | Garner et al. |
| 2009/0095689 A1* | 4/2009 | Keenan ................ 210/741 |

* cited by examiner

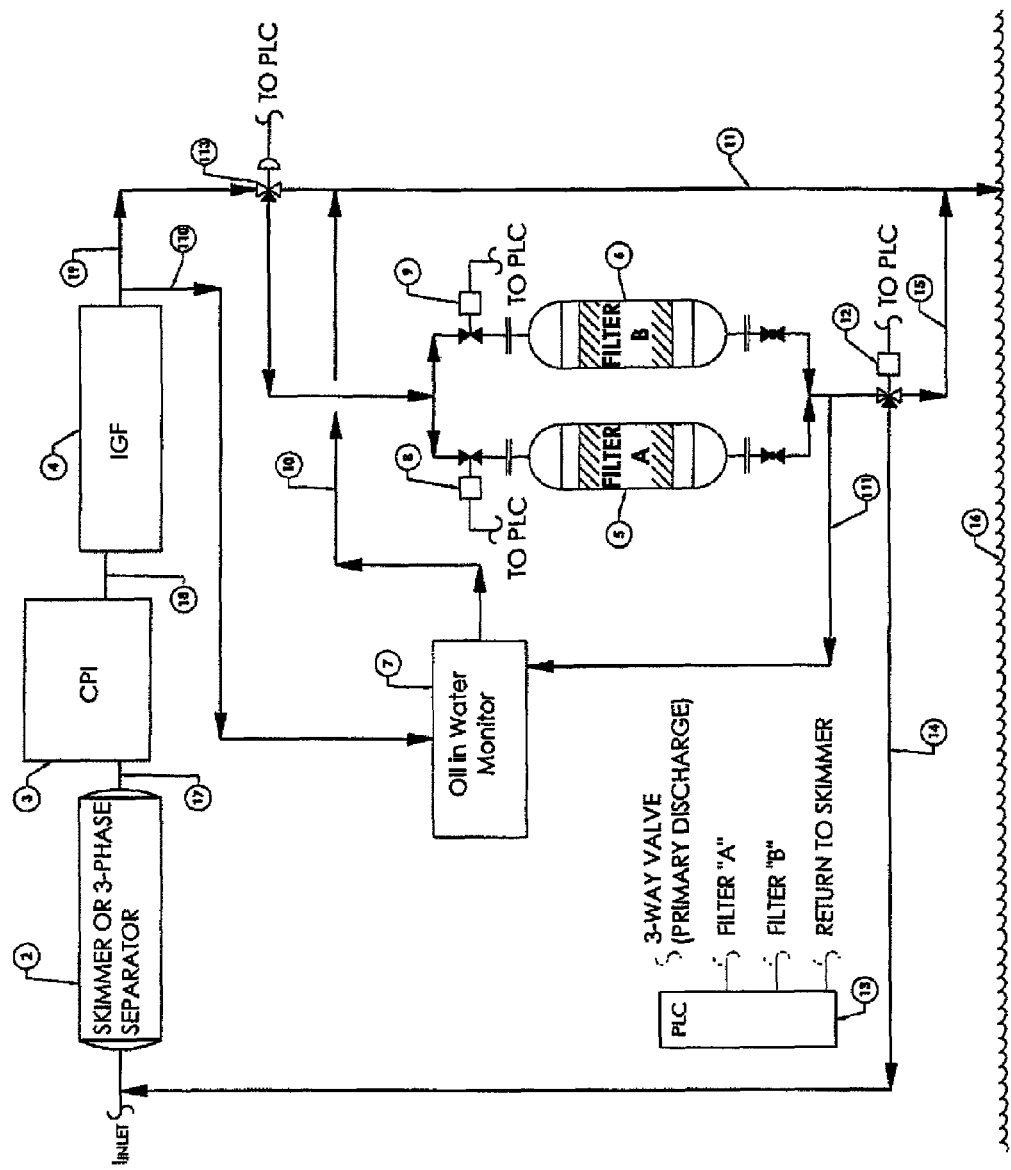

SMART WATER DISCHARGE MONITORING SYSTEM

CROSS-REFERENCE TO RELATED APPLICATIONS

Priority of U.S. Provisional Patent Application Ser. No. 61/466,267, filed Mar. 22, 2011, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a process to monitor water quality. More particularly, the present invention relates to a system which primarily relates to an offshore/onshore produced water process train but can be utilized on other process trains and is not limited to the specific application.

2. General Background of the Invention

One significant problem in the oil and other similar industries is the ability to monitor process operations in the hope of preventing oil spills, equipment upsets and maintenance indicators. In this regard, it has been determined that the Oil industry and other similar industries are overlooking this important feature in preventing oil spills, equipment upsets and overall maintenance indicators. To help prevent these from occurring it is believed that providing a series of leading indicators for process operations illustrating equipment performance and overall effectiveness is a necessary step to help prevent process discharges in excess of government regulations and looking forward thus preventing a major upset or spill.

The following U.S. Patents are incorporated herein by reference:

TABLE

| U.S. Pat. No. | TITLE | ISSUE DATE |
| --- | --- | --- |
| 5,156,745 | Induced Gas Liquid Coalescer and Flotation Separator | Oct. 20, 1992 |
| 6,077,433 | Process for Simultaneous Extraction of Dispersed and Dissolved Hydrocarbon Contaminants from Water | Jun. 20, 2000 |
| 6,491,824 | Method for Processing Returns From Oil and Gas Wells That Have Been Treated With Introduced Fluids | Dec. 10, 2002 |
| 2003/0,168,391 | Separating A Stream Containing A Multi-Phase Mixture and Comprising Lighter and Heavier Density Liquids and Particles Entrained Therein | Sep. 11, 2003 |
| 2005/0,217,999 | Wireless Electrolytic Cell Monitoring Powered by Ultra Low Bus Voltage | Oct. 06, 2005 |
| 2006/0,217,526 | Anion-Conducting Polymer Composition, and Membrane | Sep. 28, 2006 |
| 2008/0,017,558 | Methods and Devices for Improved Aeration From Vertically-Oriented Submerged Membranes | Jan. 24, 2008 |
| 2008/0,217,212 | Bituminous Froth Hydrocarbon Cyclone | Sep. 11, 2008 |

BRIEF SUMMARY OF THE INVENTION

The system and process of the present invention solves the problems confronted in the art in a simple and straightforward manner. What is provided is a system which primarily relates to an offshore/onshore produced water process train but can be utilized on other process trains and is not limited to the specific application. The online PPM monitor is patented. However, in this case the patented technology is being used as part and parcel to the overall inventive monitoring of the process. For that matter, any monitor that can sufficiently read the ppm of the process can be used. In the offshore produced water train there is equipment used to process produced water including 3phase separators, Skimmers, Free water Knockouts, CPI units, hydrocyclones, and Flotation Cells all of which provide a specific function in the process. It is noted by the present inventor, and the company, Enviro-Tech Systems, that the careful positioning of monitoring probes to read oil content in each discharge stream from each equipment is essential to this process. By having these leading indicators field personnel (those monitoring the system) will be able to react in sufficient time to prevent upsets, exceedences and spills which may occur in the future.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 illustrates an overall schematic view of Phase I of the preferred embodiment of The Smart Water Discharge Monitoring System (SWDMS) of the present invention.

DETAILED DESCRIPTION OF THE OF THE INVENTION

As stated earlier, there is a need to provide a series of leading indicators for process operations illustrating equipment performance and overall effectiveness as a necessary step to help prevent process discharges in excess of government regulations and looking forward thus preventing a major upset or spill. In general, The Smart Water Discharge Monitoring System (SWDMS) accomplishes this by monitoring in-service equipment and recording those times when that equipment operates according to specification or fails to meet the minimum discharge requirements. These data points can then be used to plan ahead for future issues, or as an analysis tool for modifying an existing wastewater process and prevent an upset condition, equipment failure leading to a spill, or unsafe conditions with catastrophic consequences. Most importantly, these data points can be used as leading indicators when a history over time is developed. These indicators can then be used as a preventative measure to reduce the likelihood of an upset condition or unsafe work environment.

The system will consist of monitors in tandem or as required working in conjunction with interface probes reading in multiple locations, and diversion valves directly operated based on the output of the interface probes and monitors. The probes relay the oil/water interface location at multiple locations throughout the process and send that data to a Programmable Logic Controller (PLC). The PLC will relay a desired action to the diversion valves based on the criteria for that particular process and location. The diversion valves will either operate normally or divert the process flow to the appropriate pre-programmed equipment. As seen in the preferred embodiment of the present invention, and particularly as set forth in FIG. 1, the system of the present invention, also referred to as The Smart Water Discharge Monitoring System (SWDMS), undertakes the process specifically by monitoring these equipments for their correct operation and alarming someone when they do not correctly. It becomes apparent that these leading indicators must be given in sufficient time to prevent the upset so when we strategically monitor at multiple points along the process we can gage a problem before it occurs.

The actual system will consist of specific monitors in tandem with interface probes reading in multiple locations, divert valves which are operated by the readings of the interface probes and online ppm monitors. Such monitors would function in conjunction with these leading indicators through a software program and computerized logic controller used to manipulate the controls of this system and illustrated in the attached schematic, FIG. 1.

In the system, Phase I is normal operation with all equipment and process discharges working within the parameter of the government standard and allowing discharge overboard. Phase II provides an exceedence in excess of the government regulation thus diverting the overboard discharge to a secondary treatment facility. The discharge would be monitored throughout the diverting of the fluid or until maintenance is performed on the equipment improving the equipment operation to a point of satisfactory discharge, so that one can divert back to the original overboard discharge point and within overboard regulations.

Phase III illustrates the event where Phase I&II both do not sufficiently meet the overboard regulation. At this point, the process flow is diverted back to the origin of the treatment process, or as a final result, the process is systematically shut in until the problem is resolved through either repair maintenance or replacement thereof. The process would be resumed after resolution of the problem. This system becomes most important to prevent not only exceedences, but also oil spills, and the system can be employed on every location with a discharge. Additionally the equipment will be Windows® based so that it can monitor long periods of processing, provide equipment operational trends, and can be remotely operated and visually reviewed due to Ethernet communications.

The following is an example of a typical set of conditions that might be programmed into the system for operation, as seen in FIG. 1.

In the Phase I condition, all equipment is reading within programmed parameters and the process flow is ultimately discharged overboard.

The Phase II condition occurs when discharge from the final primary piece of equipment 110 exceeds the programmed parameters (ex: >30 PPM). The probe located on the outlet of the flotation cell reports to the PLC an oil in water content above 30 PPM. The flotation cell diversion valve 113 receives an output from the PLC and switches the flow from overboard discharge and into filter "A" for processing. The PLC also monitors the differential pressure across filter "A". If filter "A" reports a ΔP higher than acceptable, diversion valve 8 will switch to the closed position and diversion valve 9 switches to the open position. This action transfers flow from primary filter "A" into secondary filter "B".

The Phase III condition is initiated when the oil in water content is exceeded at sampling points 110 and 111. In this condition, the process flow is diverted back into the upstream separator 2 to prevent an undesirable level of contaminants to discharge overboard. This could also mean a shut-in of the process until the root cause of the upset condition can be addressed.

The system allows users to prevent excess discharges as well as oil spills and can be employed at any location requiring a discharge permit. Additionally the graphical user interface of the process is Windows' based and can be remotely operated or reviewed. The data can be stored either locally or remotely via Ethernet communications allowing for trends to be analyzed.

This invention primarily relates to an offshore/onshore produced water process train but can be utilized on other process trains and is not limited to the specific application. As it relates to the offshore produced water equipment, the invention can be used to monitor the entire produced water train including the following equipment: 3-Phase separators, Skimmers, Free Water Knockouts (FWKO), Corrugated Plate Interceptors (CPI), Hydrocyclones, and Induced Gas Flotation Cells (IGF). Positioning of probes at key points along the produced water train allows the user to carefully monitor their produced water process from start to finish. This capability, in conjunction with diversion valves, and a PLC, affords a level of control over the entire produced water train. These tools give the field personnel responsible for the equipment time to react to upset conditions and more importantly plan for future conditions and eliminate the causes before it occur.

All measurements disclosed herein are at standard temperature and pressure, at sea level on Earth, unless indicated otherwise. All materials used or intended to be used in a human being are biocompatible, unless indicated otherwise.

PARTS LIST

The following is a list of suitable parts and materials for the various elements of the preferred embodiment of the present invention.

| Parts Number | Description |
| --- | --- |
| 1 | Smart Water discharge monitoring system |
| 2 | upstream separator |
| 3 | corrugated plate interceptor (CPI) |
| 4 | induced gas flotation (IGF) |
| 5 | filter pack "A" |
| 6 | filter pack "B" |
| 7 | oil in water monitor |
| 8 | filter pack "A" diversion valve |
| 9 | filter pack "B" diversion valve |
| 10 | oil in water monitor discharge |
| 11 | overboard primary discharge |
| 12 | filter discharge diversion valve |
| 13 | programmable logic controller (PLC) |
| 14 | filter discharge return loop |
| 15 | overboard secondary discharge |
| 16 | mean sea level |
| 17 | upstream separator to CPI discharge |
| 18 | CPI to IGF discharge |
| 19 | final process discharge |
| 110 | final process sample |
| 111 | filter process sample |
| 113 | primary discharge diversion valve |

The foregoing embodiments are presented by way of example only; the scope of the present invention is to be limited only by the following claims.

The invention claimed is:

1. A method for monitoring water discharge, comprising the following steps:
   providing a water monitoring flotation cell through which discharge water flows;
   providing a monitor to detect oil content in the water above a set parameter;
   when oil content in the water exceeds the set parameter, reporting the amount of oil to a PLC;
   sending a signal from the PLC to a cell diversion valve to switch the flow of water from an overboard discharge path to a primary processing filter;
   flowing the water to a secondary filter if the differential pressure across the primary filter exceeds a certain limit; and
   if oil content in the filtered water is detected above the set parameter, returning the water to an upstream separator to prevent an undesirable level of contaminants in the discharge stream.

2. The method in claim 1, wherein the set parameter of oil content would be greater than 30 PPM.

3. The method in claim 1, wherein the monitor to detect oil content comprises a probe on the outside of the flotation cell.

4. The method in claim 1, wherein if the oil content is below the set parameter after it exits the primary or secondary filters, the water is discharged through the overboard discharge path.

5. The method in claim 1, wherein if the oil content in the water returned to the upstream separator is not resolved, the process will be shut in until the problem is resolved.

6. A system for monitoring water discharge, comprising:
   a water monitoring flotation cell through which discharge water flows;
   a monitor to detect oil content in the water above a set parameter flowing into the flotation cell;
   a PLC for receiving input from the monitor when oil content in the water exceeds the set parameter;
   a diversion valve to switch the flow of water to divert the water from an overboard discharge path to
   a primary processing filter for receiving the water containing oil flow when the PLC detects oil content above a certain PPM;
   a secondary filter for receiving water containing oil flow from the primary filter if the differential pressure across the primary filter exceeds a certain limit;
   an upstream separator for receiving the water containing oil flow from the primary or secondary filter to prevent an undesirable level of contaminants in the discharge stream If oil content is detected above the set parameter.

7. The system in claim 6, wherein the set parameter of oil content would be greater than 30 PPP.

8. The system in claim 6, wherein the monitor to detect oil content comprises a probe on the outside of the flotation cell.

9. The system in claim 6, wherein if the oil content is below the set parameter after it exits the primary or secondary filters, the water is discharged through the overboard discharge path.

10. The system in claim 6, wherein if the oil content in the water returned to the upstream separator is not resolved, the process will be shut in until the problem is resolved.

11. A method for monitoring water discharge, comprising the following steps:
    providing a water monitoring flotation cell through which discharge water flows;
    providing a probe on the outside of the flotation cell to detect oil content in the water above a set parameter;
    when oil content in the water exceeds the set parameter of greater than 30 ppp, reporting the amount of oil to a PLC;
    sending a signal from the PLC to a cell diversion valve to switch the flow of water from an overboard discharge path to a primary processing filter;
    flowing the water to a secondary filter if the differential pressure across the primary filter exceeds a certain limit; and
    if oil content in the filtered water is detected above the set parameter, diverting the water from the overboard discharge path and, returning the water to an upstream separator to prevent an undesirable level of contaminants in the discharge stream.

* * * * *